United States Patent
Davidson

(10) Patent No.: US 9,117,159 B2
(45) Date of Patent: Aug. 25, 2015

(54) PRINTING A DOUBLE-SIDED IMAGE AND GENERATING PRINTER CONTROL DATA FOR PRINTING DOUBLE-SIDED IMAGE

(75) Inventor: Alex Davidson, Netanya (IL)

(73) Assignee: Hewlett-Packard Industrial Printing LTD., Netanya (IL)

( * ) Notice: Subject to any disclaimer, the term of this patent is extended or adjusted under 35 U.S.C. 154(b) by 0 days.

(21) Appl. No.: 14/360,068

(22) PCT Filed: Dec. 14, 2011

(86) PCT No.: PCT/IL2011/000946
§ 371 (c)(1),
(2), (4) Date: May 22, 2014

(87) PCT Pub. No.: WO2013/088430
PCT Pub. Date: Jun. 20, 2013

(65) Prior Publication Data
US 2014/0313526 A1   Oct. 23, 2014

(51) Int. Cl.
*G06F 15/00* (2006.01)
*G06K 15/02* (2006.01)
*B41J 2/21* (2006.01)
*B41J 3/407* (2006.01)
*B41J 3/60* (2006.01)
*B41J 11/00* (2006.01)
*B41M 3/00* (2006.01)

(52) U.S. Cl.
CPC ........... *G06K 15/1868* (2013.01); *B41J 2/2117* (2013.01); *B41J 3/407* (2013.01); *B41J 3/60* (2013.01); *B41J 11/0015* (2013.01); *B41M 3/008* (2013.01); *G06K 15/023* (2013.01)

(58) Field of Classification Search
CPC ............................... B41J 3/60; G06K 15/1868
USPC .......................................................... 358/1.6
See application file for complete search history.

(56) References Cited

U.S. PATENT DOCUMENTS

| 7,562,957 | B2 | 7/2009 | Mills et al. |
| 2006/0158473 | A1 | 7/2006 | Mills et al. |
| 2010/0238211 | A1 | 9/2010 | Usuda et al. |
| 2010/0283811 | A1* | 11/2010 | Falser et al. ...................... 347/12 |

FOREIGN PATENT DOCUMENTS

WO   WO-97/25158 A1   7/1997

* cited by examiner

*Primary Examiner* — Saeid Ebrahimi Dehkord

(57) ABSTRACT

According to one example of the present invention there is provided apparatus for generating control data to control an ink jet printer to print a double-sided image on a single side of a substantially transparent substrate. The apparatus comprises a processor for receiving image data of a first and a second image, a printhead control data generator to generate, from the first image, first image printhead control data, and to generate, from the second image, second image printhead control data, and a covering layer printhead control data generator to generate covering layer printhead control data.

20 Claims, 5 Drawing Sheets

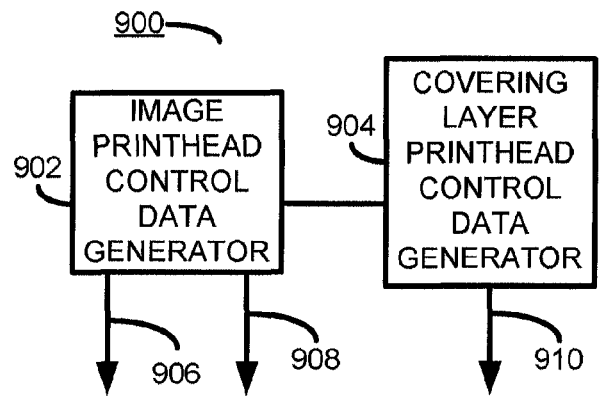
FIGURE 9
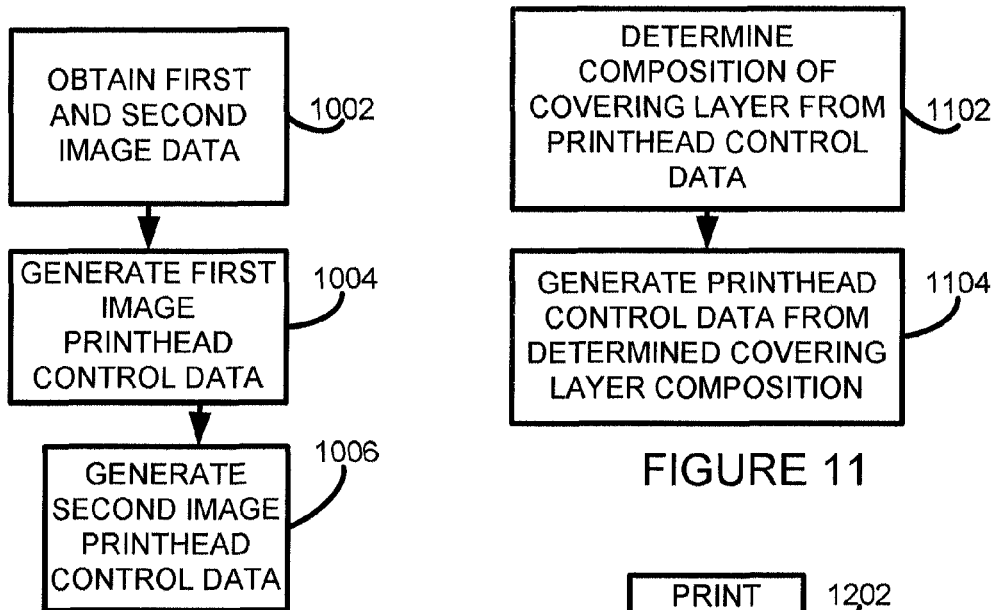
FIGURE 10
FIGURE 11
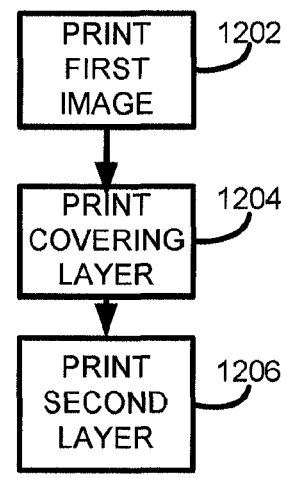
FIGURE 12

PRINTING A DOUBLE-SIDED IMAGE AND GENERATING PRINTER CONTROL DATA FOR PRINTING DOUBLE-SIDED IMAGE

BACKGROUND

Double-side images may be printed on a single side of a transparent substrate such that from one side of the substrate a first image is viewable through the substrate, and a second image is viewable from the other side of the substrate.

Typically a first image is printed on one side of the substrate. The first image is overprinted with a covering layer of white ink which ensures color accuracy of the first image. A second image is then printed on top of the uppermost layer of white ink.

However, using white ink to print the covering layer may create a number of issues. For example, although white inks may appear to be substantially opaque when viewed with reflective light, they may appear to be not completely opaque when back-lit. Accordingly, if a first image of a double-sided image printed on a transparent substrate is viewed when the second image is strongly lit, parts of the second image may become noticeable. Furthermore, double-sided images created in this way may exhibit additional undesirable image quality issues.

BRIEF DESCRIPTION

Examples, or embodiments, of the invention will now be described, by way of non-limiting example only, with reference to the accompanying drawings, in which:

FIG. 9 is a block diagram of an image processing system according to one example;

FIG. 10 is a flow diagram outlining a method of operating an image processor according to one example;

FIG. 11 is a flow diagram outlining a method of operating an image processor according to one example; and FIG. 12 is a flow diagram outline a method of operating a printing system according to one example.

DETAILED DESCRIPTION

Figure 1:
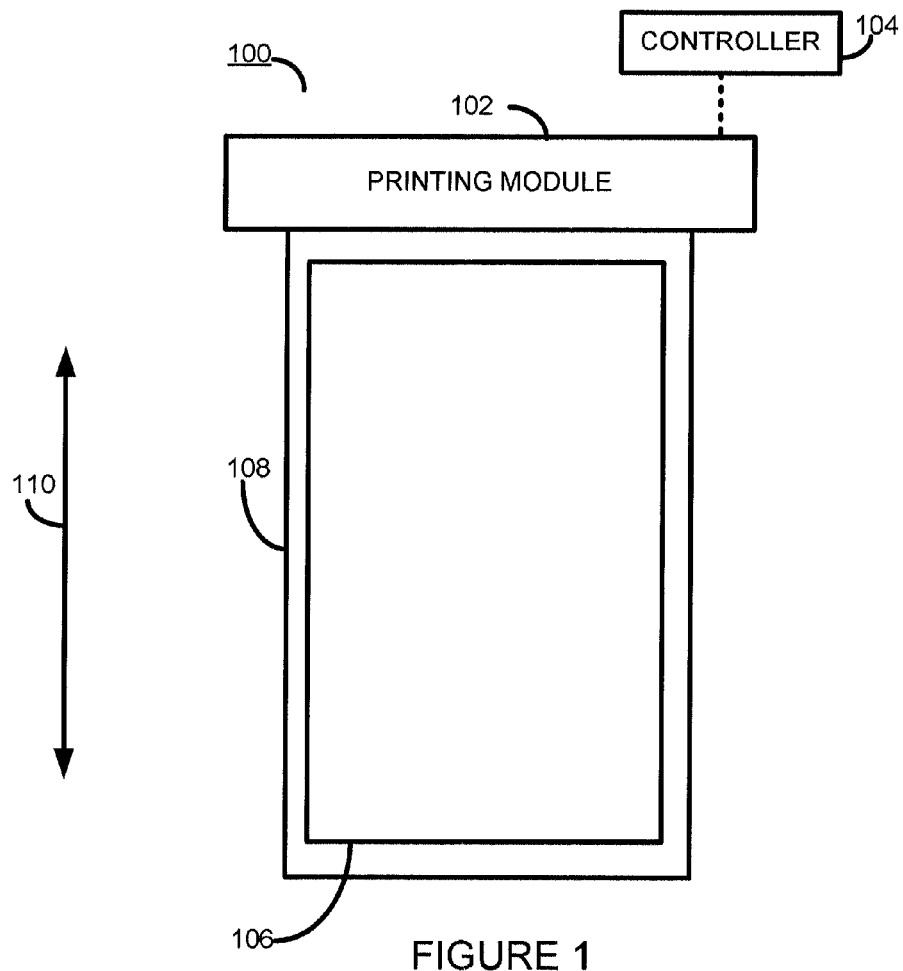
FIG. 1 is a simplified plan view of a printing system according to one example.

Referring now to FIG. 1 there is shown a simplified plan view of a printing system 100 according one example.

The printing system 100 comprises a printing module 102 configured to eject ink drops from one or multiple printheads (not shown) onto a substrate 106 when loaded onto a substrate support 108.

In one example the printing module 102 is configured to remain stationary (although printheads within the printing module 102 may or may not remain stationary) whilst the substrate support 108 moves in the direction of a printing axis 110. In a further example the substrate support 108 is configured to remain stationary whilst the printing module 102 moves in the direction of the printing axis 110, for example on a moveable carriage. In both examples, the printing system 100 operates to incrementally form a printed image on a substrate 106 when loaded onto the substrate support 108.

In at least one example, the substrate support 108 may be connected to a vacuum system to securely hold a substrate loaded on the substrate support 108 to the substrate support.

The printing system 100 is configured to print on a single side of a transparent substrate in such a way that one image is viewable through a first side of the transparent substrate and a second image is viewable on a second side of the transparent substrate.

Figure 2:
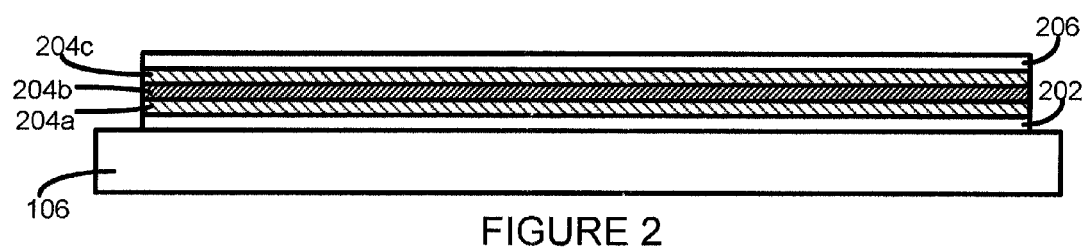
FIG. 2 is simplified section view of a double-side image printed on a transparent substrate according to one example.

FIG. 2 shows a simplified illustration of a section of a transparent substrate 106 on which such a double-side image has been printed according to one example. The substrate 106 has a first image 202 printed on one side of a transparent substrate 106, a covering layer 204 overprinted on the first printed image 202, and a second image 206 overprinted on the covering layer 204.

In one example, the covering layer 204 comprises a first layer 204a of white ink overprinted on the first image 202, an intermediate layer 204b of a different color ink overprinted on the first layer 204a, and a second layer 204c of white ink overprinted on the opaque layer 204b. In one example the intermediate layer 204b is printed using black ink which is opaque or substantially opaque.

Figure 3:
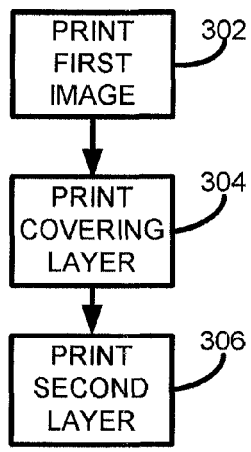
FIG. 3 is a flow diagram outlining a method of operating a printing system according to one example

A method of operating the printing system 100 according to one example will now be described with further reference to FIG. 3.

At 302 the printing system 100 is controlled, for example by the controller 104, to print a first image 202 on a substrate loaded on the substrate support 108. At 304 the printing system 100 is controlled by the controller 104 to print a covering layer 204 on top of the printed first image 202. In one example the covering layer comprises a first layer of white ink 204a, a second layer of black ink 204b, and a third layer of white ink 204c. At 306 the printing system 100 is controlled by the controller 104 to print a second image on top of the third layer of white ink 204c.

Printing the covering layer 204 in this manner provides a number of advantages. For example, the inclusion of an opaque or substantially opaque intermediate layer 204b enables the covering layer 204 as a whole to be opaque or substantially opaque, even when backlit. Furthermore, the quantity of white ink used in the covering layer 204 is reduced, thereby reducing the costs of producing such double-sided prints compared to using a single thick white ink layer.

In one example, the printing system 100 uses ultra-violet (UV) curable inks which are cured by applying UV radiation (e.g. in the form of UV light) to ink printed on a substrate. In one example, the printing system 100 operates to print each of first and second images and layers 204a to 204c one at a time, and to cure the ink printed in each layer before printing the next layer. In a further example, the printing system 100 is configured to print and cure a single swath of each layer, before proceeding to print and cure a subsequent swath.

Unless otherwise mentioned, reference herein to printing, when referring to curable inks such as UV curable inks, is intended to cover both the steps of ejecting ink drops onto a substrate and subsequently curing those ink drops within a short time of those ink drops being deposited. For example, using so-called in-line curing, curing of deposited ink drops happens shortly after the ink drops have been deposited on a substrate.

Inkjet printing systems, however, generally do not eject the same number of ink drops to be deposited on each spatial location of a substrate, depending on the content of the image being printed. When printing with water-based or solvent-based inks on porous substrates, such as paper, ink drops are absorbed into the substrate and become substantially absorbed into the substrate.

Figure 4:
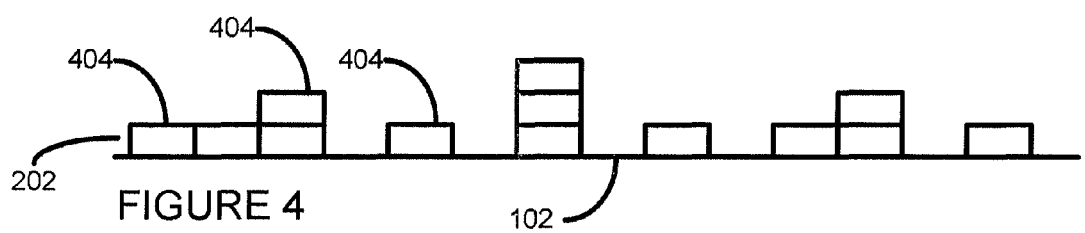
FIG. 4 is a simplified illustration of a section of an image printed on a substrate.

However, printing on non-porous substrates, such as plastics, glass, metal, or the like, it is more usual to use curable inks, such as ultra-violet (UV) curable inks and to apply radiation, such as UV radiation, to printed ink drops to cure them. Since the ink drops are not absorbed by a non-porous substrate cured ink drops printed thereon typically have a thickness or height in the region of 5 to 20 microns, depending on the type of ink. Accordingly, when printing with such inks on non-porous substrates the height or thickness profile of the printed images 202 and 206 are likely to be irregular, as shown in greater detail in FIG. 4.

For the purposes of illustration in the accompanying drawings ink drops are shown by blocks 404. It will be appreciated, however, that real cured ink drops will have a different shape profile.

Figure 5:
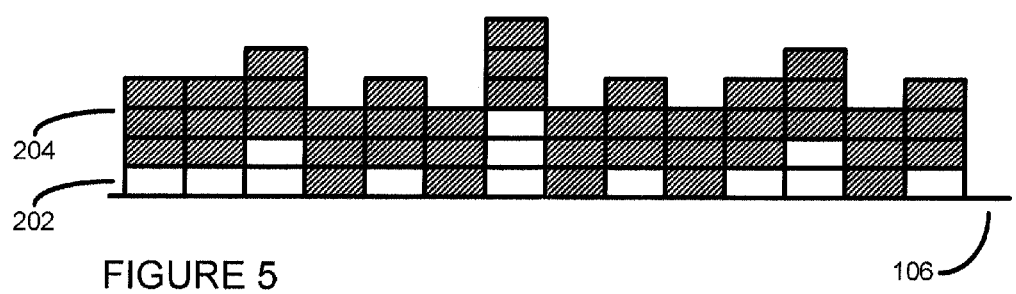
FIG. 5 is a simplified illustration of a section of an image printed on a substrate according to one example.

It has been realized, however, that due to the irregular height profile of the first printed image 202, printing a uniform thickness covering layer 204 atop the first printed image 202, as shown in FIG. 5, leads to the base (i.e. the top surface of the covering layer) on which the second image 206 is to be printed having an irregular height profile. Since the height profile of the covering layer corresponds to the content of the first printed image 202, image quality issues or image artifacts may be noticeable on the second printed image, particularly under certain lighting or viewing conditions. It has been further realized that the above-mentioned artifacts do not cause significant image quality issues when they correspond to the content of a printed image.

Figure 6:
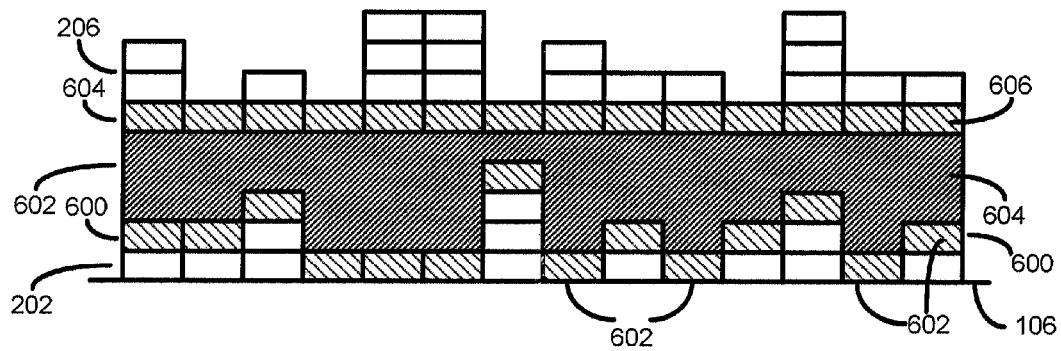
FIG. 6 is a simplified illustration of a section of an image printed on a substrate according to one example.

To overcome, or to at least substantially alleviate, the above-mentioned problems, according to examples of the present invention a variable height covering layer (600, 602, 604) is printed atop the first printed image 202 such that the upper surface of the covering layer 604 is substantially flat, as shown in FIG. 6. In this way the second image 206 may be printed on a substantially flat surface, and therefore the previously mentioned image quality issues may be eliminated, or be at least substantially reduced.

In one example the covering layer (600, 602, 604) comprises a first uniform thickness white ink layer 600 printed atop the first image 202. When the first white ink layer 600 is printed it substantially follows the height profile of the first image 202 on which it was printed. A thick opaque black ink layer 602 is then overprinted on the first white ink layer 602, but curing of the black ink layer is delayed, for example, for between about 5 to 30 seconds, allowing the black ink time to settle such that the upper surface of the black ink layer 602 becomes substantially flat. In one example the thick black layer comprises 2 or more drops of black ink deposited at substantially every spatial location corresponding to the first image 202. The black ink layer 602 is then cured, and a second white ink layer 604 is overprinted thereon. The second image 206 may then be printed on the second white ink layer 604.

Figure 7:
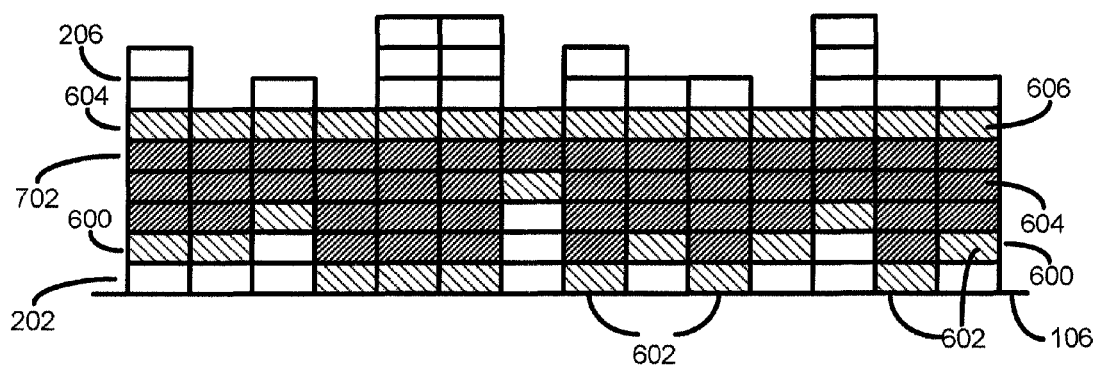
FIG. 7 is a simplified illustration of a section of an image printed on a substrate according to one example.

In a yet further example, as shown in FIG. 7, the covering layer (600, 702, 604) comprises a first substantially uniform thickness layer of white ink 600 overprinted on the first image 202. Atop the first layer of white ink 600 is overprinted a variable height opaque or substantially opaque layer 702. The opaque layer 702 may, in one example, be printed using black ink, and in another example a specialty opaque ink may be used. The number of ink drops deposited at any one spatial location of the substrate to form the opaque layer 702 is based on the corresponding number of ink drops deposited at the same spatial location of the first image 202. In this way, the opaque layer 702 has a top surface which is substantially flat, on which is printed a further uniform thickness layer of white ink 604. The second image 204 may then be printed atop the uppermost white layer 604.

Figure 8:
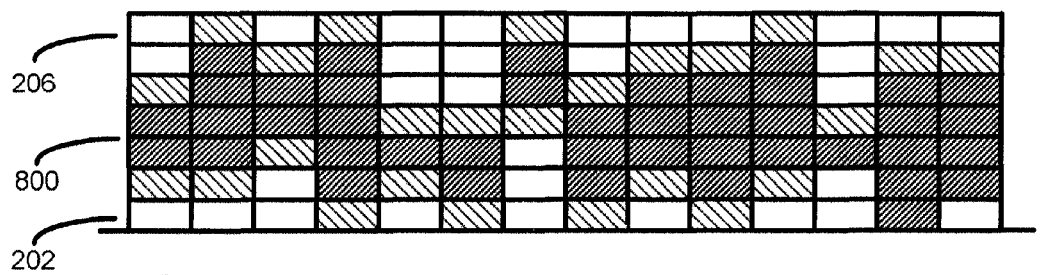
FIG. 8 is a simplified illustration of a section of an image printed on a substrate according to one example.

In a yet further example, as shown in FIG. 8, the height or thickness of the covering layer 800 is determined additionally based on the height profile of the second image 206 when printed, such that the top surface of the second image 206, when printed, is substantially flat.

In further examples the varying height or thickness of the covering layer may be generated by modifying the number of white ink drops deposited at each spatial location on the substrate. In some examples this may be performed in addition to, or in place of, varying the thickness of the opaque layer.

Operation of the printing system 100 according to one example will now be described with additional reference to FIGS. 9, 10, and 11.

FIG. 9 is a block diagram of an image processor 900 according to one example. The image processor 900 comprises an image printhead control data generator 900 and a covering layer printhead control data generator 904. In one example the image processor 900 includes a memory in which processor readable instructions are stored and which, when executed by the processor, control the printing system 100 in accordance with the method described herein.

The image printhead control data generator 900 obtains (block 1002, FIG. 10) first image data representing a first image to be printed and second image data representing a second image to be printed. The image data may, in one example, be in the form of a multi-bit CMYK image, or any other suitable image format.

At block 1004, the image printhead control data generator 900 processes the first image data to generate first image printhead control data 906. The first image printhead control data 906 is data in any suitable format usable by a printing system controller, such as the controller 104 of FIG. 1, to control one or multiple printheads to eject ink drops corresponding to the content of the first image.

At block 1006, the image printhead control data generator 900 processes the second image data to generate second image printhead control data 908. The second image printhead control data 908 is data in any suitable format usable by a printing system controller, such as the controller 104 of FIG. 1, to control one or multiple printheads to eject ink drops corresponding to the content of the second image.

The generated image printhead control data defines, for different ones of the printheads in the printing system 100, the number of ink drops that are to be deposited at any single addressable spatial location on a substrate to reproduce the an image in printed form.

The operation of the covering layer printhead control data generator 904, according to one example, will now be described with additional reference to FIG. 11.

At block 1102, the covering layer printhead control data generator 904 determines, from the generated first image printhead control data, the composition of the covering layer to overprint on the first image. This determination is based by determining, for each addressable spatial location on a substrate, the number of ink drops that are to be printed in that location according to the first image printhead control data.

By addressable spatial location is meant a spatial location on a substrate at which the printing system is capable of ejecting an ink drop. The determination is also partly based on the desired characteristics of the covering layer, as described below.

The covering layer printhead control data generator 904 analyses the first image printhead control data 906 to determine the maximum number of ink drops that are to be deposited at any single spatial location when the first image is printed ($MAXHEIGHT_{FIRST\_IMAGE}$). To this, the covering layer printhead control data generator 904 adds the desired thickness (in terms of the number of ink drops) of the covering layer ($THICKNESS_{COVER\_LAYER}$), to determine the height (in terms of the number of ink drops) of the top surface of the covering layer (from the top surface of the substrate) once printed ($HEIGHT_{SECOND\_IMAGE\_BASE}$)

$$HEIGHT_{SECOND\_IMAGE\_BASE} = MAXHEIGHT_{FIRST\_IMAGE} + THICKNESS_{COVER\_LAYER} \quad (1)$$

The covering layer printhead control data generator 904 then determines, for each spatial location of the first image, the number of drops of ink that are be deposited at that location such that the combined number of image ink drops and covering layer ink drops at each spatial location is at the determined number ($HEIGHT_{SECOND\_IMAGE\_BASE}$).

At block 1104 the covering layer printhead control data generator 904 generates, covering layer printhead control data 908 that may be used by a printing system, such as the printing system 100, to print the covering layer in the determined manner.

Once the covering layer printhead control data 910 has been generated a printer controller, such as the printer controller 104 may be controlled in accordance with the method outlined below and described with additional reference to FIG. 12. At block 1202 the printer controller 104 controls the printing system 102 to print the first image, in accordance with the first image printhead control data 906. At block 1204 the printer controller 104 controls the printing system 102 to print the covering layer, in accordance with the generated covering layer printhead control data 910. At block 1206 the printer controller 104 controls the printing system 102 to print the second image, in accordance with the second image printhead control data 908.

In one example, the image printhead control data generator 902 and covering layer printhead control data generator 904 may be implemented in a raster image processor (RIP) or other image processor to generate printhead control data useable by an inkjet printing system.

In a further example, the image printhead control data generator 902 and covering layer printhead control data generator 904 may be implemented in a printer controller associated with a printing system, such as a printer controller 104.

In a yet further example, the covering layer printhead control data generator 904 may be implemented as a separate controller within a printing system, and may obtain first image printhead control data from an existing controller within a printing system.

Due to the cost of ink, the thickness of the covering layer(s) (500, 700, 702, 704) is, in one example, is designed to minimize ink usage, especially usage of white ink which is currently significantly more expensive than black ink. The thickness of the covering layer 500, or of the separate covering layer layers 700, 702, and 704, therefore depends on the characteristics of each ink used.

In one example, the each white layer is printed to be at least 2 ink drops thick, although in other examples a larger or smaller thickness may be used. In one example, the opaque lay is printed to be at least 2 ink drops thick, although in other examples a larger or smaller thickness may be used.

It will be appreciated that examples or embodiments of the present invention can be realized in the form of hardware, software or a combination of hardware and software. As described above, any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples of the present invention. Examples of the present invention may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of printing a double-sided image on a substantially transparent substrate, comprising:
   printing a first image;
   printing a covering layer atop the first image, the covering layer comprising a first white ink layer atop the first image, a substantially opaque ink layer atop the first white layer and a second white layer atop the opaque ink layer; and
   printing a second image atop the covering layer.

2. The method of claim 1, wherein the step of printing the substantially opaque ink layer comprises printing the covering layer such that the upper surface thereof is substantially flat.

3. The method of claim 2, wherein the step of printing the covering layer comprises printing first and second white ink layers having uniform thickness, and printing a variable thickness substantially opaque layer, the thickness of the substantially opaque layer being based on the first image.

4. The method of claim 3, wherein the step of printing the covering layer comprises printing a variable thickness substantially opaque layer, the thickness of the substantially opaque layer being based on the first and second image.

5. The method of claim 1, wherein the method is a method of ink jet printing.

6. The method of claim 1, wherein the substantially opaque ink layer is printed with black ink.

7. The method of claim 1, further comprising, after depositing ink of the substantially opaque layer, allowing the deposited ink of the substantially opaque layer to settle so as to produce an even upper surface for the substantially opaque layer on which the second white layer is disposed.

8. The method of claim 1, further comprising varying a thickness of the substantially opaque ink layer.

9. Apparatus for generating control data to control an ink jet printer to print a double-sided image on a single side of a substantially transparent substrate, the apparatus comprising:
- a processor for receiving image data of a first and a second image;
- a printhead control data generator to generate, from the first image, first image printhead control data, and to generate, from the second image, second image printhead control data; and
- a covering layer printhead control data generator to generate covering layer printhead control data, the covering layer printhead control specifying a varying thickness of a corresponding covering layer so as to produce an even surface over the first image when printed.

10. The apparatus of claim 9, wherein the printhead control data generator generates printhead control data to cause a printer to print the first and the second image.

11. The apparatus of claim 10, wherein the covering layer printhead control data generator generates covering layer printhead control data to cause a printer to print a first uniform thickness white layer atop the first image, to print a substantially opaque layer atop the first white layer, and to print a second uniform thickness white layer atop the substantially opaque layer.

12. The apparatus of claim 11, wherein the covering layer printhead control data generator generates covering layer printhead control data to cause the substantially opaque layer to be printed in black ink.

13. The apparatus of claim 10, wherein the covering layer printhead control data generator generates covering layer printhead control data such that, when printed atop the first image, the upper surface of the covering layer is substantially flat.

14. The apparatus of claim 10, wherein the covering layer printhead control data generator generates covering layer printhead control data such that, when the second image is printed atop the covering layer the upper surface of the second image is substantially flat.

15. The apparatus of claim 14, wherein the covering layer printhead control data generator determines, from the first image printhead control data, the number of ink drops to be deposited at each spatial location of a substrate on which an image is to be printed, and further wherein the printhead control data generator determines therefrom the number of ink drops to be deposited at each spatial location of the substrate to form the covering layer.

16. The apparatus of claim 15, wherein the covering layer printhead control data generator determines the number of ink drops to be deposited at each spatial location of the substrate to form the opaque layer, such that the upper surface of the opaque layer, when printed, is substantially flat.

17. The apparatus of claim 9, further comprising a controller to control a printing system in accordance with the generated printhead control data to print the first image, to print a covering layer atop the first image, and to print the second image atop the covering layer.

18. A printed article comprising a substantially transparent substrate on which is printed, on a single side of the substrate:
- a first image;
- a covering layer overprinted on the first image, and comprising a first white layer overprinted on the first image, a substantially opaque layer overprinted on the first white layer, and a second white layer overprinted on the substantially opaque layer; and
- a second image overprinted on the second white layer.

19. The printed article of claim 18, wherein the substantially opaque layer comprises black ink.

20. The printed article of claim 18, wherein a thickness of the substantially opaque layer varies.

* * * * *